E. E. CLOSE.
NUT LOCK.
APPLICATION FILED OCT. 24, 1910.
1,002,197.
Patented Aug. 29, 1911.
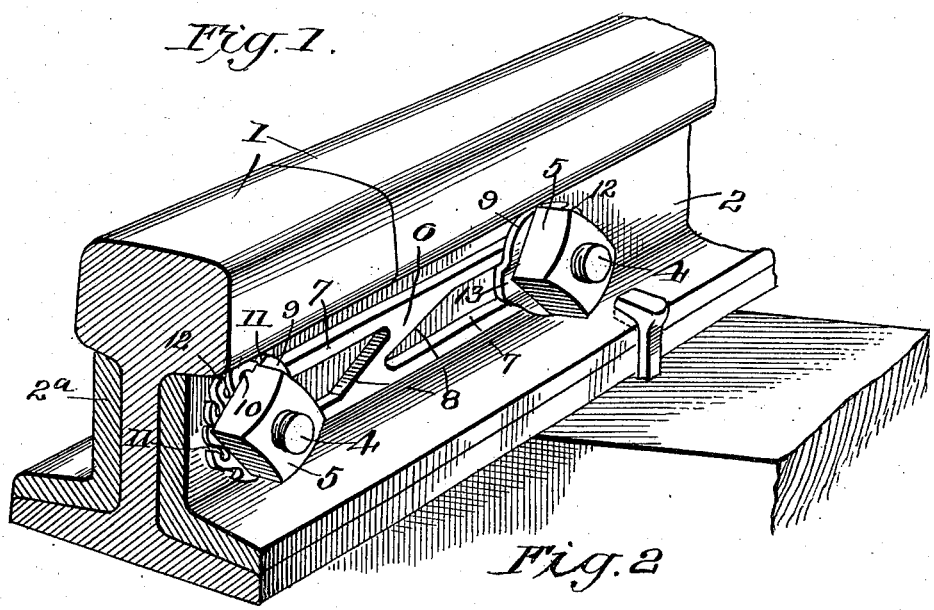
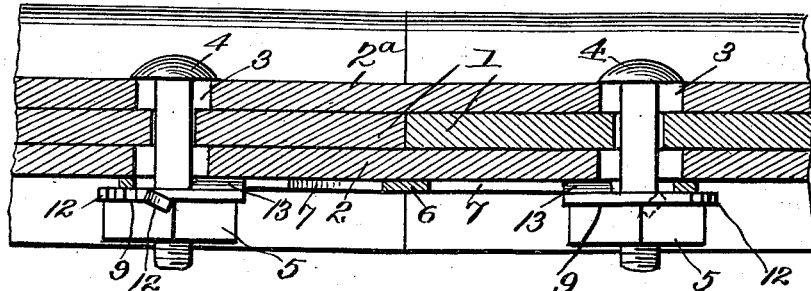
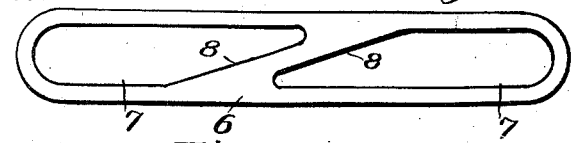
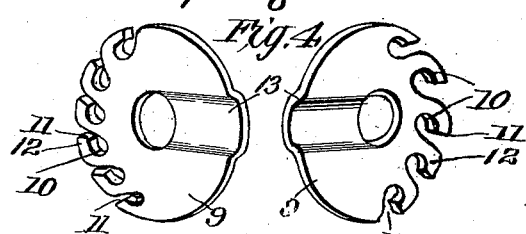
Witnesses
Inventor
E. E. Close
By
Attorneys

UNITED STATES PATENT OFFICE.

EDMUND E. CLOSE, OF BROCKTON, MASSACHUSETTS, ASSIGNOR OF TWO-FIFTHS TO RUPERT L. GREENLEAF, OF BROCKTON, MASSACHUSETTS.

NUT-LOCK.

1,002,197. Specification of Letters Patent. Patented Aug. 29, 1911.

Application filed October 24, 1910. Serial No. 588,797.

*To all whom it may concern:*

Be it known that I, EDMUND E. CLOSE, citizen of the United States, residing at Brockton, in the county of Plymouth and State of Massachusetts, have invented certain new and useful Improvements in Nut-Locks, of which the following is a specification.

The present invention comprehends certain new and useful improvements in nut locks, and relates more particularly to an improved device of this character which is designed primarily for use in connection with rail joints.

It is well known that when the rail sections expand and contract they shift the bolts back and forth in the elongated openings that are provided therefor in the fish plates. The fish plates are spiked or otherwise rigidly secured to the cross ties and do not move with the rail sections. When the nuts are tightened against the fish plates they tend to prevent the bolts from operating in the elongated openings, whereby to subject the bolts to excessive shearing strains and to materially increase the friction between the parts.

The object of the present invention is to provide an improved nut lock which is arranged to securely lock the nuts on a pair of adjacent bolts, certain parts of the nut lock being movable longitudinally with the bolts so as to compensate for the expansion and contraction of the rail sections.

A further object of the invention is the provision of a nut lock including a tie-bar formed with a pair of slots for the reception of the respective bolts, and lock washers mounted on the bolts in abutting relation to the tie-bar and adapted to engage with the nuts. Each lock washer has a depressed portion which operates in the adjacent slot to hold the washer against rotary movement and to guide it in its longitudinal movement.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing, in which:

Figure 1 is a sectional perspective view illustrating the application of my improved nut lock; Fig. 2 is a horizontal section thereof; Fig. 3 is a face view of the tie-bar; and, Fig. 4 is a detail perspective view of the lock washers detached.

Corresponding and like parts are referred to in the following description and indicated in all the views of the drawing by the same reference characters.

Referring to the drawing the numeral 1 designates a pair of companion rail sections the meeting ends of which are confined between the usual fish plates 2 and $2^a$. The fish plates are spiked or otherwise rigidly secured to the cross ties in order to be positively held against longitudinal creeping movement. The rail sections and fish plates are provided with registering openings 3 through which the bolts 4 are inserted to connect the parts of the rail joint together. The bolts fit snugly in the openings in the rail sections, but fit loosely in the openings in the fish plates, the last-named openings being preferably elongated so as to permit the bolts to be carried back and forth therein by and upon the expansion and contraction of the rail sections. The extremities of both bolts are threaded in the same direction and outstand from the fish plate 2 and are engaged by nuts 5. The above parts are of well-known construction and hence do not require further description.

In carrying out the present invention I provide a tie-bar 6 which is placed longitudinally against the outer face of the fish plate 2 and spans the joint. In its end portions the tie-bar is formed with a pair of separate longitudinally extending slots 7 through which pass the bolts secured to the respective rail sections. The slots are of substantially uniform width, except at their adjacent ends where they taper gradually and overlap, thereby providing oppositely facing inclined end walls 8.

An annular lock washer 9 is mounted on each bolt and is interposed between the nut 4 and the tie-bar. The washer is formed with an arcuate series of circular apertures 10 which extend approximately halfway therearound and are arranged concentrically to the central opening thereof. Each aperture has a contracted throat portion 11 that opens outwardly through the periphery of the washer. The metal between the apertures constitutes a circumferential series of hooked lugs 12, the lugs normally lying in the plane of the washer and all facing in the same circular direction which is the direction in which the nut is turned to effect the tightening thereof. The lock washer is of sufficient diameter so that the series of lugs project beyond the adjacent end of the tie-bar. The lugs are thus arranged in spaced relation to the fish plate, thereby permitting a screw driver or other suitable instrument to be inserted behind any selected one of the lugs for the purpose of bending the same outwardly at oblique angles to the plane of the washer. In this position the lug is arranged to bear terminally behind the adjacent corner of the nut and positively locks the nut against accidental loosening movement. The other half of the lock washer is substantially smooth and is depressed, as indicated at 13, between substantially parallel lines extending from the inner to the outer edge of the washer. The depressed portion is received between the parallel side walls of the adjacent slot and serves as a stop to prevent any rotary movement of the washer relative to the tie-bar. The stop has limited longitudinal play in the slot to compensate for expansion and contraction of the rail sections, and to guide the washer in its movement.

From the foregoing description in connection with the accompanying drawing it will be apparent that I have provided an improved nut lock which is thoroughly reliable and efficient in operation, which possesses to a marked degree the characteristics of simplicity, durability and strength, and which is susceptible of being easily and cheaply manufactured. The parts of the device may be quickly assembled and may be expeditiously adjusted to retain the nuts in any desired positions. The nuts may be released when occasion requires, by merely bending the lugs back into the plane of the washer.

The lock washers are substantial duplicates and may be used at either end of the tie bar. The tightening of the nuts tends to turn the lock washers on the bolts. This causes the depressed portions 13 to exert lateral pressure on one wall of the adjacent slots. The effect of this pressure would be to spread one wall of one slot upwardly and one wall of the other slot downwardly. However, the oppositely inclined end walls 8 reinforce the tie bar in proximity to the points where the strain is exerted, and thus resist said pressure and prevent injury to the tie bar.

Having thus described the invention, what is claimed is:

1. In a rail joint, the combination with a pair of fish plates having elongated bolt openings, a rail section confined between the fish plates, a bolt passing through the rail section and operating in the elongated openings, and a nut working on the bolt, of a lock washer loosely mounted on the bolt and engaging with the nut, and an operative connection between the washer and the adjacent fish plate to hold the washer against relative turning movement and to afford the washer play in the direction of the elongated openings to compensate for expansion and contraction of the rail.

2. In a rail joint, the combination with a bolt passing through the rail section and operating in elongated openings in the fish plates, and a nut working on the bolt, of a lock washer loosely mounted on the bolt and engaging the nut, the washer having an inwardly projecting stop, and means provided between the fish plate and the washer for engaging with the stop to hold the washer against relative turning movement and to afford the washer play in the direction of the elongated openings to compensate for expansion and contraction of the rail.

3. In a rail joint, the combination with a bolt passing through the rail section and operating in elongated openings in the fish plates, and a nut working on the bolt, of a plate rigidly mounted at the outer face of one of the fish plates and formed with a slot through which the bolt passes, a lock washer loosely mounted on the bolt and engaging the nut, and means provided on the washer and operating in the slot to hold the washer against relative turning movement and to afford the washer limited play to compensate for the expansion and contraction of the rail.

4. In a rail joint, the combination with a pair of adjacent bolts passing through the respective rail sections and operating in elongated openings in the fish plates, and nuts working on the bolts, of a tie-bar disposed at the outer face of one of the fish plates and formed with longitudinally extending slots through which the respective bolts pass, and a lock washer loosely mounted on each bolt and engaging with the nut, the washer having inwardly projecting stops operating in the slots to hold the washer against relative turning movement and to afford the washer limited play to compensate for expansion and contraction of the rail sections.

5. In a nut lock, the combination of a member formed with a slot, a bolt passing through the slot, a nut working on the bolt, a washer mounted on the bolt and engaging with the nut, and means, provided between the washer and the member, retaining the washer against turning movement relative to the member, the said means and the bolt having play in the direction of the length of the slot.

In testimony whereof, I affix my signature in presence of two witnesses.

EDMUND E. CLOSE. [L. S.]

Witnesses:
  DANIEL MCCARTHY,
  FRED N. FARNUM.

---

Copies of this patent may be obtained for five cents each, by addressing the "Commissioner of Patents, Washington, D. C."